(12) United States Patent
Naitou

(10) Patent No.: US 10,471,931 B2
(45) Date of Patent: Nov. 12, 2019

(54) VEHICLE DOOR UNLOCKING SYSTEM AND ON-BOARD CONTROL DEVICE

(71) Applicants: AUTONETWORKS TECHNOLOGIES, LTD., Yokkaichi, Mie (JP); SUMITOMO WIRING SYSTEMS, LIMITED, Yokkaichi-Shi, Mie (JP); SUMITOMO ELECTRIC INDUSTRIES, LTD., Osaka-Shi, Osaka (JP)

(72) Inventor: Kazutaka Naitou, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/080,224

(22) PCT Filed: Mar. 21, 2017

(86) PCT No.: PCT/JP2017/011199
§ 371 (c)(1),
(2) Date: Aug. 27, 2018

(87) PCT Pub. No.: WO2017/164165
PCT Pub. Date: Sep. 28, 2017

(65) Prior Publication Data
US 2019/0016303 A1    Jan. 17, 2019

(30) Foreign Application Priority Data

Mar. 23, 2016  (JP) ................................ 2016-059193

(51) Int. Cl.
*B60R 25/24*    (2013.01)
*E05B 49/00*    (2006.01)
(Continued)

(52) U.S. Cl.
CPC ............ *B60R 25/24* (2013.01); *B60R 25/245* (2013.01); *E05B 49/00* (2013.01);
(Continued)

(58) Field of Classification Search
CPC ....... B60R 25/24; B60R 25/245; E05B 49/00; E05B 81/04; E05B 81/56
See application file for complete search history.

(56) References Cited

U.S. PATENT DOCUMENTS 7,868,735 B2 * 1/2011 Nakashima ............. B60R 25/24
340/426.28
2004/0227656 A1    11/2004 Asakura et al.
(Continued)

FOREIGN PATENT DOCUMENTS

JP    2001-49919 A    2/2001
JP    2008-115653 A    5/2008
(Continued)

OTHER PUBLICATIONS

May 30, 2017 Interntional Search Report issued in International Patent Application PCT/JP2017/011199.

*Primary Examiner* — Quan-Zhen Wang
*Assistant Examiner* — Rajsheed O Black-Childress
(74) *Attorney, Agent, or Firm* — Oliff PLC

(57) ABSTRACT

A vehicle door unlocking system that includes a mobile device that is provided with an interface for accepting an operation to unlock a plurality of doors provided on a vehicle, and is configured to transmit an operation signal when the interface has accepted the operation; and an on-board controller configured to perform, upon receiving the operation signal from the mobile device, control to unlock the plurality of doors based on the received operation signal.

7 Claims, 7 Drawing Sheets

(51) Int. Cl.
*G07C 9/00* (2006.01)
*E05B 81/04* (2014.01)
*E05B 81/56* (2014.01)
*E05B 81/74* (2014.01)

(52) U.S. Cl.
CPC .......... *G07C 9/00309* (2013.01); *E05B 81/04* (2013.01); *E05B 81/56* (2013.01); *E05B 81/74* (2013.01); *G07C 2009/00357* (2013.01); *G07C 2009/00769* (2013.01); *G07C 2209/63* (2013.01)

(56) References Cited

U.S. PATENT DOCUMENTS

| | | | |
|---|---|---|---|
| 2005/0168322 A1 | 8/2005 | Appenrodt et al. | |
| 2015/0332530 A1* | 11/2015 | Kishita | B60R 25/245 70/256 |
| 2016/0304052 A1 | 10/2016 | Naitou | |
| 2017/0267211 A1* | 9/2017 | Sugita | B60R 25/01 |

FOREIGN PATENT DOCUMENTS

| | | |
|---|---|---|
| JP | 2015-105526 A | 6/2015 |
| WO | 2015/079892 A1 | 6/2015 |

\* cited by examiner

VEHICLE DOOR UNLOCKING SYSTEM AND ON-BOARD CONTROL DEVICE

This application is the U.S. National Phase of PCT/JP2017/011199 filed Mar. 21, 2017, which claims priority from JP 2016-059193 filed Mar. 23, 2016, the entire disclosure of which is incorporated herein by reference.

BACKGROUND

The present disclosure relates to a vehicle door unlocking system and an on-board control device that unlock vehicle doors with an operation of a mobile device.

Door locking systems that enable unlocking and locking of vehicle doors without using any mechanical key have come into practical use. In a keyless entry system, which is one such door locking system, when an operation unit (an unlock button or a lock button) provided on a mobile device is operated by a user, the mobile device transmits an operation signal to an on-board device, and the on-board device that has received the operation signal controls unlocking and locking of vehicle doors.

For example, JP 2015-105526A discloses a configuration in which, when a user operates an unlock button of a mobile device in the vicinity of a vehicle, only a vehicle door located closest to the mobile device is unlocked, and when the user operates the unlock button of the mobile device at a position remote from the vehicle, all of the vehicle doors are unlocked.

SUMMARY

However, JP 2015-105526A has the configuration in which, when the user operates the unlock button of the mobile device at a position remote from the vehicle, all of the vehicle doors are unlocked, and thus there is the problem that, when all of the vehicle doors are unlocked, a suspicious individual hiding in a blind spot from the authorized user (the owner of the vehicle, for example) may enter the vehicle.

An exemplary aspect of the disclosure provides a vehicle door unlocking system and an on-board control device that can prevent a suspicious individual from entering a vehicle when vehicle doors are unlocked.

A vehicle door unlocking system according to one aspect of the present disclosure includes: a mobile device that is provided with an interface for accepting an operation to unlock a plurality of doors provided on a vehicle, and is configured to transmit an operation signal when the interface has accepted the operation; and an on-board controller configured to perform, upon receiving the operation signal from the mobile device, control to unlock the plurality of doors based on the received operation signal, wherein the on-board controller includes: a detector configured to detect the mobile device, and the on-board controller is configured to unlock only a specific door of the plurality of doors provided on the vehicle, upon receiving the operation signal from the mobile device without the mobile device being detected by the detector.

An on-board control device according to one aspect of the present disclosure is capable of communicating with a mobile device configured to transmit an operation signal upon accepting an operation to unlock a plurality of doors provided on a vehicle, the on-board controller performing, upon receiving the operation signal from the mobile device, control to unlock the plurality of doors based on the received operation signal, wherein the on-board control device includes: a detector configured to detect, the mobile device, and the on-board controller is configured to unlock only a specific door of the plurality of doors of the vehicle, upon receiving an operation signal from the mobile device without the mobile device being detected by the detector.

According to the present application, it is possible to prevent a suspicious individual from entering a vehicle when vehicle doors are unlocked.

DETAILED DESCRIPTION OF EMBODIMENTS

Figure 1:
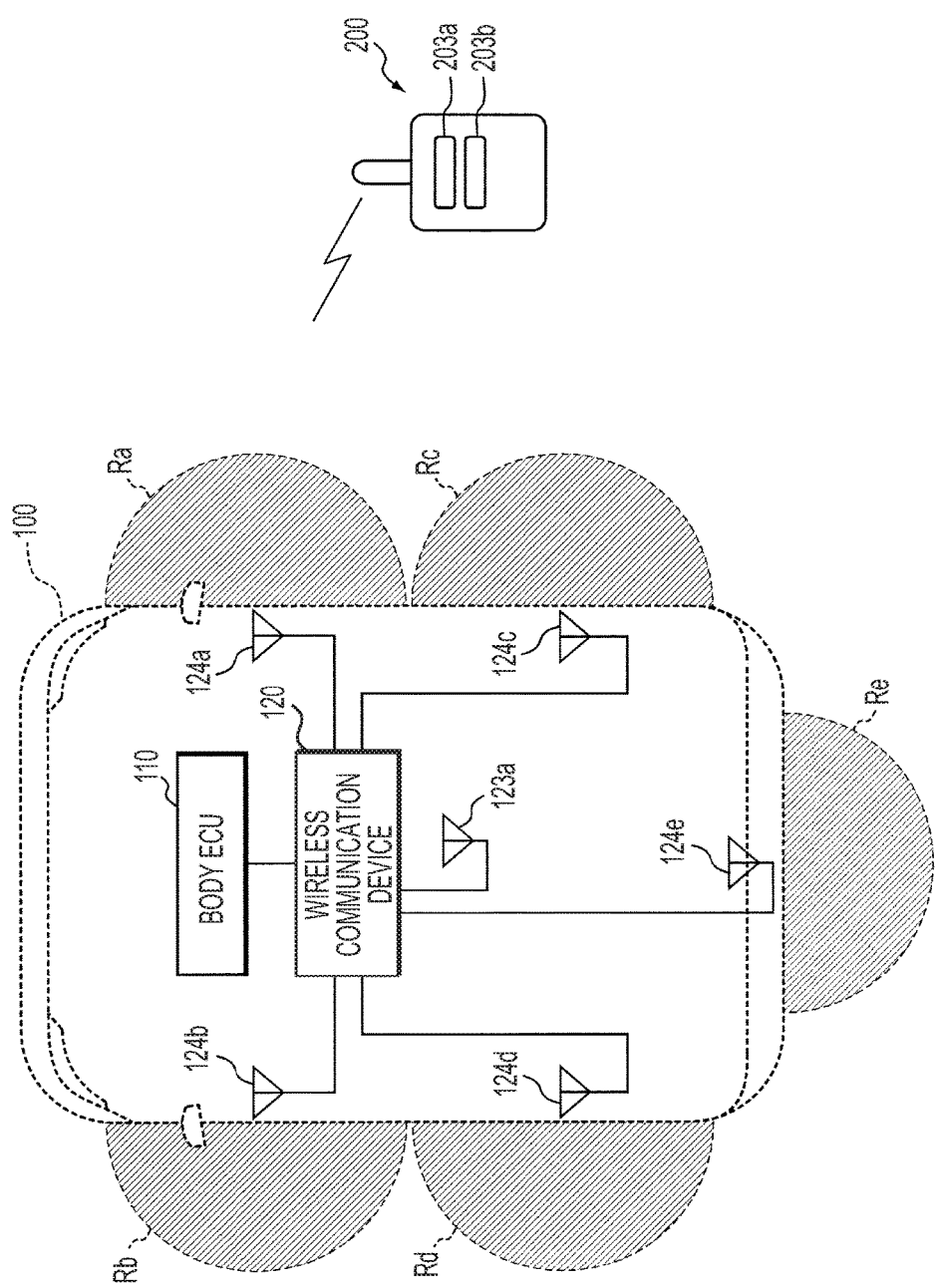
FIG. 1 is a schematic diagram illustrating a schematic configuration of a door locking system according to Embodiment 1.

Embodiments of the present disclosure will be described in order. At least part of the embodiments described below may also be combined with each other as appropriate.

A vehicle door unlocking system according to one aspect of the present application relates to a vehicle door unlocking system including: a mobile device that is provided with an operation unit for accepting an operation to unlock a plurality of doors provided on a vehicle, and is configured to transmit an operation signal when the operation unit has accepted the operation; and an on-board control device configured to perform, upon receiving the operation signal from the mobile device, control to unlock the plurality of doors based on the received operation signal, wherein the on-board control device includes: a detection unit configured to detect the mobile device, and the on-board control device is configured to unlock only a specific door of the plurality of doors provided on the vehicle, upon receiving the operation signal from the mobile device without the mobile device being detected by the detection unit.

According to the above-described aspect, if it can be determined that an operation to unlock the vehicle doors has been made at a position remote from the vehicle, only a specific door (the driver seat-side door, for example) is unlocked, thus reducing the likelihood that a malicious person may enter the vehicle.

In the vehicle door unlocking system according to one aspect of the present application, the on-board control device is configured to unlock all of the doors of the vehicle, if the mobile device is detected by the detection unit and the operation signal is received from the mobile device.

According to the above-described aspect, if it can be determined that an operation to unlock the vehicle doors has been made in the vicinity of the vehicle, all of the doors of the vehicle are unlocked, and thus convenience is ensured.

In the vehicle door unlocking system according to one aspect of the present application, the vehicle includes: a detection signal transmitting unit configured to transmit a detection signal for detecting the mobile device; and a response signal receiving unit configured to receive a response signal in response to the detection signal transmitted by the detection signal transmitting unit, the mobile device includes: a detection signal receiving unit configured to receive the detection signal transmitted from the detection signal transmitting unit; and a response signal transmitting unit configured to transmit the response signal in response to the detection signal received by the detection signal receiving unit, and the detection unit is configured to detect the mobile device based on the response signal received by the response signal receiving unit.

According to the above-described aspect, by performing wireless communication between the vehicle-side communication device and the mobile device, it is possible to detect as to whether or not the mobile device is present in the vicinity of the vehicle.

In the vehicle door unlocking system according to one aspect of the present application, the detection signal that is transmitted by the detection signal transmitting unit is a signal in an LF (Low Frequency) band, and the response signal that is transmitted by the response signal transmitting unit is a signal in an RF (Radio Frequency) band.

According to the above-described aspect, by performing communication using two signals in different frequency bands, it is possible to provide different vehicle door unlocking methods between a case where a user who operates the mobile device is present in the vicinity of the vehicle, and a case where the user is present remote from the vehicle.

In the vehicle door unlocking system according to one aspect of the present application, the specific door is a door on a driver seat side.

According to the above-described aspect, only the driver seat-side door, which is highly likely to be opened by the user, is unlocked.

In the vehicle door unlocking system according to one aspect of the present application, the mobile device includes: a measurement unit configured to measure a signal strength of a detection signal received by the detection signal receiving unit, and an information adding unit configured to add information relating to the signal strength measured by the measurement unit to a response signal to be transmitted from the response signal transmitting unit, and the on-board control device includes: a determination unit configured to determine, if an operation signal has been received from the mobile device without the mobile device being detected by the detection unit, whether or not a response signal has been received from the mobile device within a set time period; and a decision unit configured to specify, if it is determined that a response signal has been received from the mobile device within the set time period, a door to be unlocked based on the information relating to a signal strength that is included in the received response signal.

According to the above-described aspect, since only the vehicle door that the authorized user is about to open can be unlocked, even if a suspicious individual is hiding in a blind spot from the user, the door in the vicinity of the suspicious individual remains locked. As a result, it is possible to prevent the suspicious individual from entering the vehicle.

An on-board control device according to one aspect of the present application is capable of communicating with a mobile device configured to transmit an operation signal upon accepting an operation to unlock a plurality of doors provided on a vehicle, the on-board control device performing, upon receiving the operation signal from the mobile device, control to unlock the plurality of doors based on the received operation signal, wherein the on-board control device includes: a detection unit configured to detect the mobile device, and the on-board control device is configured to unlock only a specific door of the plurality of doors of the vehicle, upon receiving an operation signal from the mobile device without the mobile device being detected by the detection unit.

According to the above-described aspect, if it can be determined that an operation to unlock the vehicle doors has been made at a position remote from the vehicle, only a specific door (for example, the driver seat-side door) is unlocked, thus reducing the likelihood that a malicious person may enter the vehicle.

Hereinafter, the present disclosure will specifically be described with reference to the drawings illustrating the embodiments thereof.

Embodiment 1

FIG. 1 is a schematic diagram illustrating a schematic configuration of a door locking system according to Embodiment 1. The door locking system according to Embodiment 1 is a system for locking or unlocking a plurality of doors (hereinafter, referred to also as "vehicle doors") of a vehicle 100, and is provided with a body ECU (Electronic Control Unit) 110 and a wireless communication device 120, which are provided inside the vehicle 100, and a mobile device 200 that is operated by a user.

The body ECU 110 is connected to the wireless communication device 120, and has the functions of wirelessly communicating with the mobile device 200 via the wireless communication device 120, and controlling locking and unlocking of the vehicle doors.

In order to wirelessly communicate with the mobile device 200, the wireless communication device 120 is provided with an RF receiving antenna 123a and a plurality of LF transmitting antennas 124a to 124e. The RF receiving antenna 123a is, for example, an antenna provided inside the wireless communication device 120, and receives a signal in an RF (RF: Radio Frequency) band. The LF transmitting antennas 124a to 124e are, for example, antennas provided in the vicinity of the respective doors of the vehicle 100, and transmit signals in an LF (LF Low Frequency) band. In the present embodiment, the LF transmitting antennas 124a to 124e are respectively provided in the vicinity of a driver seat side-door, a front passenger seat side-door, a right rear seat side-door (behind the driver seat), a left rear seat side-door (behind the front passenger seat), and a back door.

The mobile device 200 is provided with an unlock button 203a and a lock button 203b to accept vehicle door unlock and lock operations made by a user. Furthermore, the mobile device 200 is provided with an RF transmitting unit 204 and an LF receiving unit 205 to wirelessly communicate with the vehicle-side wireless communication device 120 (see FIG. 3). When the unlock button 203a or the lock button 203b has accepted a vehicle door unlock or lock operation made by a user, the mobile device 200 can transmit, from the RF transmitting unit 204, a signal instructing that the vehicle doors be unlocked or locked.

Here, wireless communication using LF band signals has a communication range of about 1 meter, while wireless communication using RF band signals has a communication range of about several tens of meters. In the present embodiment, this fact is used to perform switching between unlocking all of the doors of the vehicle 100 and unlocking a specific door (the driver seat side-door, for example) of the vehicle 100. Specifically, if the mobile device 200 is present in any of communication ranges Ra to Re of the LF transmitting antennas 124a to 124e of the vehicle 100, the body ECU 110 controls all of the doors of the vehicle 100 to be unlocked upon receiving an operation signal instructing that the vehicle doors be unlocked from the mobile device 200. Furthermore, if the mobile device 200 is not present in any of the communication ranges Ra to Re of the LF transmitting antennas 124a to 124e, the body ECU 110 controls a specific door to be unlocked upon receiving an operation signal instructing that the vehicle doors be unlocked from the mobile device 200.

Figure 2:
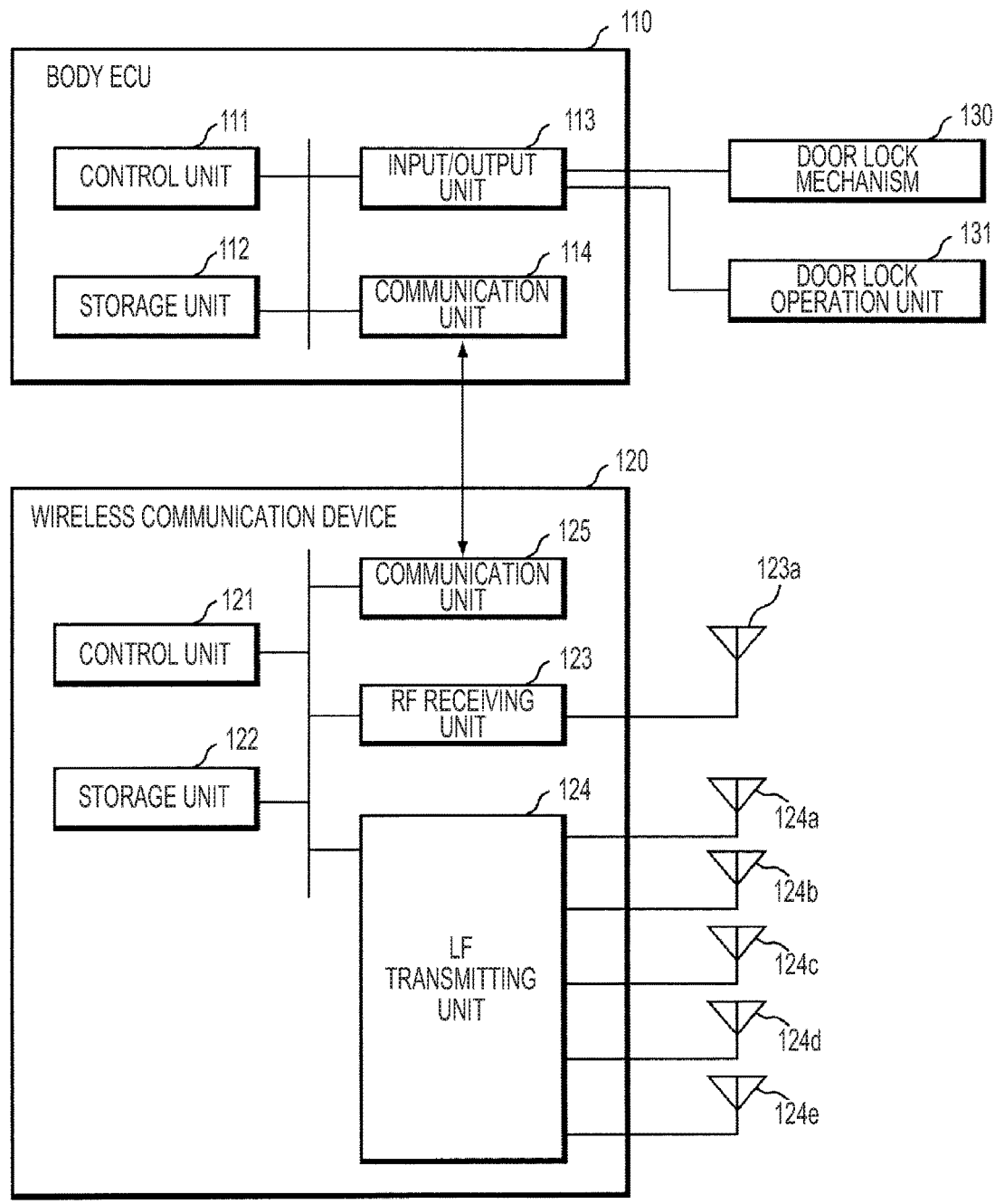
FIG. 2 is a block diagram illustrating internal configurations of a body ECU and a wireless communication device.

FIG. 2 is a block diagram illustrating internal configurations of the body ECU 110 and the wireless communication device 120. The body ECU 110 is provided with a control unit 111, a storage unit 112, an input/output unit 113, a communication unit 114, and the like.

The control unit 111 includes, for example, a CPU (Central Processing Unit), a ROM (Read Only Memory), a RAM (Random Access Memory), and the like. By executing a control program stored in the ROM, the CPU of the control unit 111 controls the operations of the pieces of hardware included in the body ECU 110, and causes the device as a whole to function as the on-board control device/controller of the vehicle door unlocking system according to the present application. Various types of data generated during the execution of the control program are stored in the RAM of the control unit 111. Note that the control unit 111 may also function as a timer for counting time that has elapsed from when it is instructed to start counting to when it is instructed to end the counting, a counter for counting up a number, and the like.

The storage unit 112 is constituted by, for example, a nonvolatile memory such as an EEPROM (Electronically Erasable Programmable Read Only Memory), and stores identification information for identifying the body ECU 110, and the like. Here, the identification information for identifying the body ECU includes, for example, the ID (Identifier) number of the vehicle 100 on which the body ECU 110 is installed, the ID number of the mobile device 200 serving as a communication counterpart, key information for use in encryption processing, and the like.

The input/output unit 113 includes interfaces to which a door lock mechanism 130 and a door lock operation unit 131 are connected.

The door lock mechanism 130 has a mechanical mechanism for locking or unlocking the doors of the vehicle 100, an actuator for electrically activating the mechanic mechanism, and the like. Also, the door lock operation unit 131 is, for example, a key cylinder provided in the driver seat-side door of the vehicle 100, a request switch provided on the door handle, or the like.

For example, if a mechanical key (not shown) for the vehicle 100 is inserted into a key cylinder provided in the door of the vehicle 100, and a lock operation or an unlock operation is performed, the door lock mechanism 130 activates the actuator or the like to lock or unlock the doors. At this time, information indicating that the key cylinder has been operated using the mechanical key is output to the door lock mechanism 130 via the input/output unit 113, and the door lock mechanism 130 operates based on the output information.

Furthermore, if the user holding the mobile device 200 operates the request switch provided on the door handle of the vehicle 100, wireless communication is performed between the body ECU 110 and the mobile device 200. Upon, in the wireless communication, the wireless communication device 120 transmitting a detection signal from the LF transmitting antennas 124a to 124e, and has received a response signal from the mobile device 200 in response to the detection signal, the body ECU 110 locks or unlocks a door. Note that the request switch may also be a push-button switch, or a switch using a contact sensor for detecting contact with the door handle.

Furthermore, the body ECU 110 is configured to be able to lock or unlock a door using wireless communication between the body ECU 110 and the mobile device 200, without the door lock operation unit 131 being operated by the user. Specifically, when an operation signal from the mobile device 200 is received by the RF receiving antenna 123a of the wireless communication device 120, the body ECU 110 locks or unlocks a door based on unlocking or locking-related information included in the received operation signal.

The communication unit 114 includes a CAN communication interface for example, and is connected to the communication unit 125 on the wireless communication device 120 side via a communication line. The communication unit 114 transmits and receives data to and from the wireless communication device 120 in accordance with a CAN protocol.

The wireless communication device 120 includes a control unit 121, a storage unit 122, an RF receiving unit 123, an LF transmitting unit 124, a communication unit 125, and the like.

The control unit 121 includes, for example, a CPU, a ROM, a RAM, and the like. By executing a control program stored in the ROM of the storage unit 122, the CPU of the control unit 121 controls the operations of the pieces of hardware included in the wireless communication device 120.

The storage unit 122 is constituted by a nonvolatile memory such as an EEPROM, and stores control programs for executing processing for wireless communication with the mobile device 200, processing for CAN communication with the body ECU 110, and the like.

The RF receiving unit 123 is connected to the RF receiving antenna 123a, and is provided with a reception circuit for receiving a signal in an RF band via the RF receiving antenna 123a, a measurement circuit for measuring the received signal strength (RSSI: Received Signal Strength Indicator) of a received signal, and the like. In the present embodiment, the RF receiving unit 123 receives, via the RF receiving antenna 123a, an operation signal transmitted from the mobile device 200, and transmits the received operation signal to the control unit 121. The control unit 121 transmits the operation signal received from the RF receiving unit 123 to the body ECU 110 via the communication unit 125.

The LF transmitting unit 124 is provided with a signal generation circuit for generating signals in an LF band based on a signal output from the control unit 121, an amplifying circuit for amplifying the generated signals, and the like, and transmits the amplified signals to the outside from the LF transmitting antennas 124a to 124e. In the present embodiment, the LF transmitting unit 124 transmits detection signals for detecting the mobile device 200 via the LF transmitting antennas 124a to 124e, in accordance with an instruction from the control unit 121. Here, the detection signals transmitted by the LF transmitting unit 124 include identification information of the body ECU 110 that is stored in the storage unit 112.

The communication unit 125 includes a CAN communication interface for example, and is connected to the communication unit 114 on the body ECU 110 side via the communication line. The communication unit 125 transmits and receives data to and from the body ECU 110 in accordance with a CAN protocol.

Figure 3:
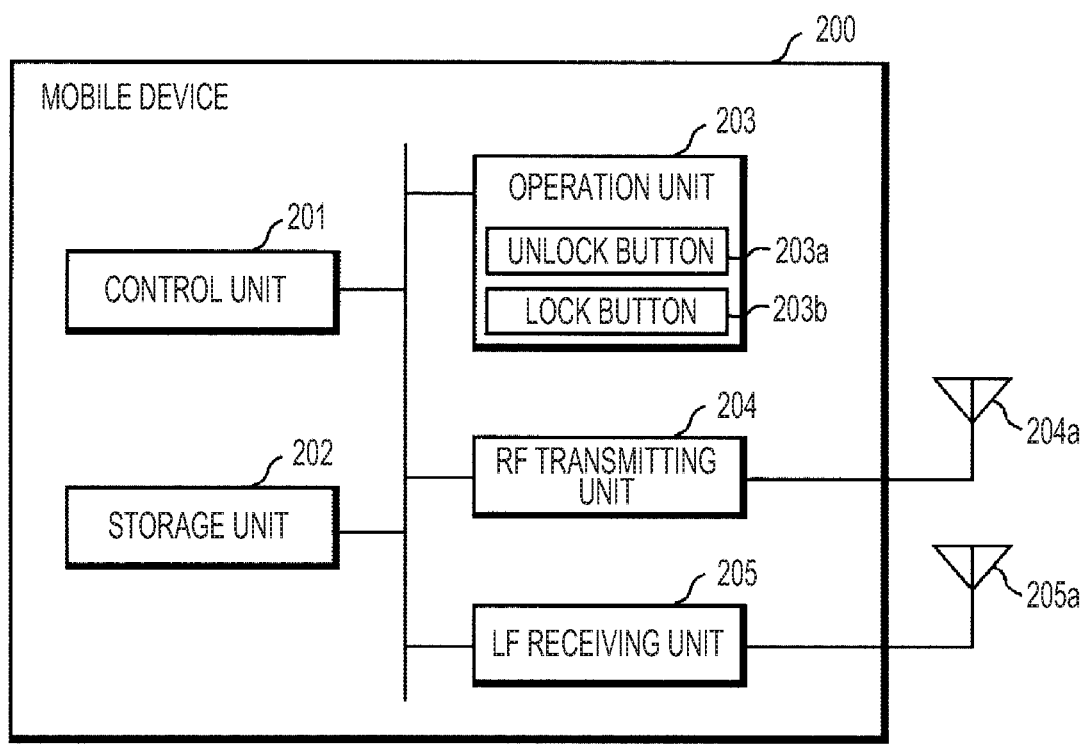
FIG. 3 is a block diagram illustrating an internal configuration of a mobile device.

FIG. 3 is a block diagram illustrating an internal configuration of the mobile device 200. The mobile device 200 includes a control unit 201, a storage unit 202, an operation unit 203 (i.e., interface), an RF transmitting unit 204, an LF receiving unit 205, and the like.

The control unit 201 includes, for example, a CPU, a ROM, and the like. By executing a control program stored in the ROM, the CPU of the control unit 201 controls the operations of the pieces of hardware included in the mobile device 200, and causes the device as a whole to function as the mobile device of the vehicle door unlocking system according to the present application. Note that the control unit 201 may also function as a timer for counting time that has elapsed from when it is instructed to start counting to when it is instructed to end the counting, a counter for counting up a number, and the like.

The storage unit 202 is constituted by, for example, a nonvolatile memory such as an EEPROM, and stores identification information for identifying the mobile device 200. Here, the identification information for identifying the mobile device 200 includes, for example, the ID number of the mobile device 200, the ID number of the vehicle 100 on which the body ECU 110 serving as a communication counterpart is installed, key information for use in encryption processing, and the like.

The operation unit 203 includes interfaces for accepting a user operation. In the present embodiment, the operation unit 203 includes the unlock button 203a operated when the doors of the vehicle 100 are to be unlocked, and the lock button 203b operated when the doors of the vehicle 100 are to be locked. When the unlock button 203a (or the lock button 203b) is operated by the user, the operation unit 203 outputs a signal indicating that the unlock button 203a (or the lock button 203b) has been operated to the control unit 201. Upon receiving the signal indicating that the unlock button 203a (or the lock button 203b) has been operated, the control unit 201 transmits a control signal instructing that the doors of the vehicle 100 be unlocked (or locked) to the RF transmitting unit 204.

The RF transmitting unit 204 is provided with a signal generation circuit for generating a signal in an RF band based on the control signal output from the control unit 201, an amplifying circuit for amplifying the generated signal, and the like, and transmits the amplified signal to the outside from the RF transmitting antenna 204a. In the present embodiment, the RF transmitting unit 204 transmits an operation signal instructing that the vehicle doors be unlocked (or locked) from the RF transmitting antenna 204a, in accordance with the control signal output from the control unit 201. Here, the operation signal and a later-described response signal that are transmitted by the RF transmitting unit 204 include identification information of the mobile device 200 that is stored in the storage unit 202.

The LF receiving unit 205 is connected to an LF receiving antenna 205a, and is provided with a reception circuit for receiving signals in an RF band via the LF receiving antenna 205a, a measurement circuit for measuring the signal strength of the received signals, and the like. In the present embodiment, the LF receiving unit 205 receives, using the LF receiving antenna 205a, detection signals transmitted from the LF transmitting antennas 124a to 124e of the vehicle 100, and transmits the received detection signals to the control unit 201. Upon receiving a detection signal from the LF receiving unit 205, the control unit 201 performs processing for transmitting, from the RF transmitting unit 204, a response signal in response to the detection signal. At this time, the control unit 201 transmits, from the RF transmitting unit 204, a response signal to which pieces of information relating to the signal strengths (RSSI) of the respective detection signals transmitted from the LF transmitting antennas 124a to 124e are added.

The following will describe an operation of the door locking system according to the present embodiment.

Figure 4:
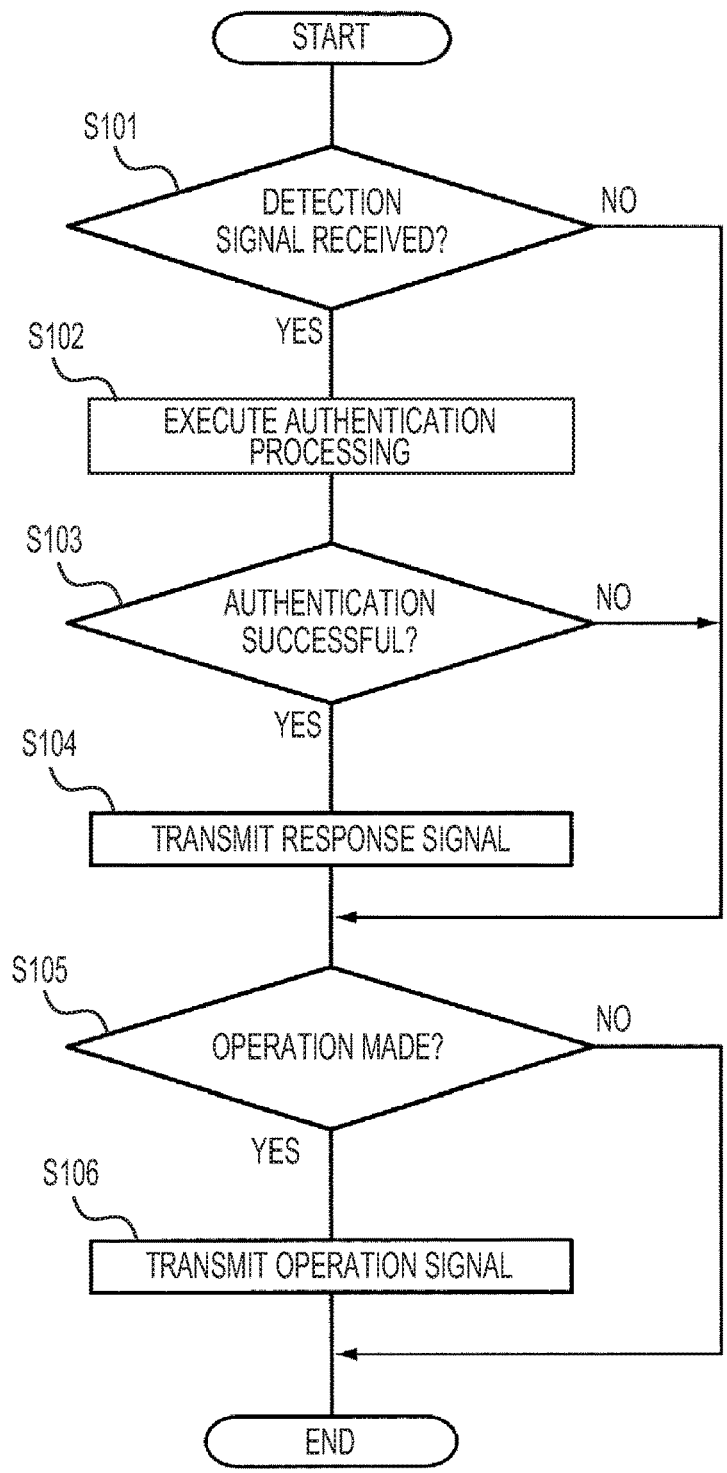
FIG. 4 is a flowchart illustrating the procedure of processing performed by the mobile device.

FIG. 4 is a flowchart illustrating the procedure of processing performed by the mobile device 200. The control unit 201 of the mobile device 200 determines whether or not a detection signal transmitted from the LF transmitting unit 124 of the vehicle 100 has been received by the LF receiving unit 205 (step S101). If it is determined that a detection signal has not been received (No, in step S101), the control unit 201 moves to processing in later-described step S105.

If it is determined that a detection signal has been received (Yes in step S101), the control unit 201 executes authentication processing based on the received detection signal (step S102). Since detection signals transmitted from the LF transmitting unit 124 of the vehicle 100 include identification information for identifying the body ECU 110, the control unit 201 can execute the authentication processing by comparing the identification information included in the detection signals with the identification information of the mobile device 200 stored in the storage unit 202.

Then, the control unit 201 determines whether or not authentication was successful in the authentication processing executed in step S102 (step S103). If it is determined that authentication was not successful (No in step S103), the control unit 201 moves to the processing in later-described step S105.

If it is determined that authentication was successful (Yes in step S103), the control unit 201 transmits, from the RF transmitting unit 204, a response signal in response to the detection signal (step S104). At this time, the control unit 201 transmits, from the RF transmitting unit 204, a response signal to which pieces of information relating to the signal strengths (RSSI) of the respective detection signals transmitted from the LF transmitting antennas 124a to 124e are added.

Then, the control unit 201 determines whether or not a user operation (an unlock operation or a lock operation) has been accepted by the operation unit 203 (step S105). If the unlock button 203a (or the lock button 203b) has been operated (Yes in step S105), the operation unit 203 transmits, to the control unit 201, a signal indicating that an operation has been made. Accordingly, the control unit 201 can determine whether or not a user operation (an unlock operation or a lock operation) has been accepted by the operation unit 203, as a result of receiving a signal from the operation unit 203.

If it is determined that no user operation has been accepted (No in step S105), the control unit 201 ends the procedure according to this flowchart. On the other hand, if it is determined that a user operation has been accepted, the control unit 201 transmits an operation signal that includes information indicating one of an unlock operation and a lock operation, identification information of the mobile device 200, and the like to the outside via the RF transmitting unit 204 (step S106).

Note that, with reference to the flowchart of FIG. 4, a procedure has been described in which whether or not a detection signal has been received is determined, and then whether or not a user operation has been made is determined, but it is of course possible to determine whether or not a user operation has been made, and then whether or not a detection signal has been received.

In the door locking system according to the present embodiment, control is performed such that all of the doors are unlocked or only a specific door is unlocked, depending on whether or not a user holding the mobile device 200 is present in any of the communication ranges Ra to Re of the LF transmitting antennas 124a to 124e of the vehicle 100 at the time when the user operated the unlock button 203a of the operation unit 203. Accordingly, the body ECU 110 installed in the vehicle 100 performs processing for detecting the mobile device 200 that is present in the communication ranges Ra to Re.

Figure 5:
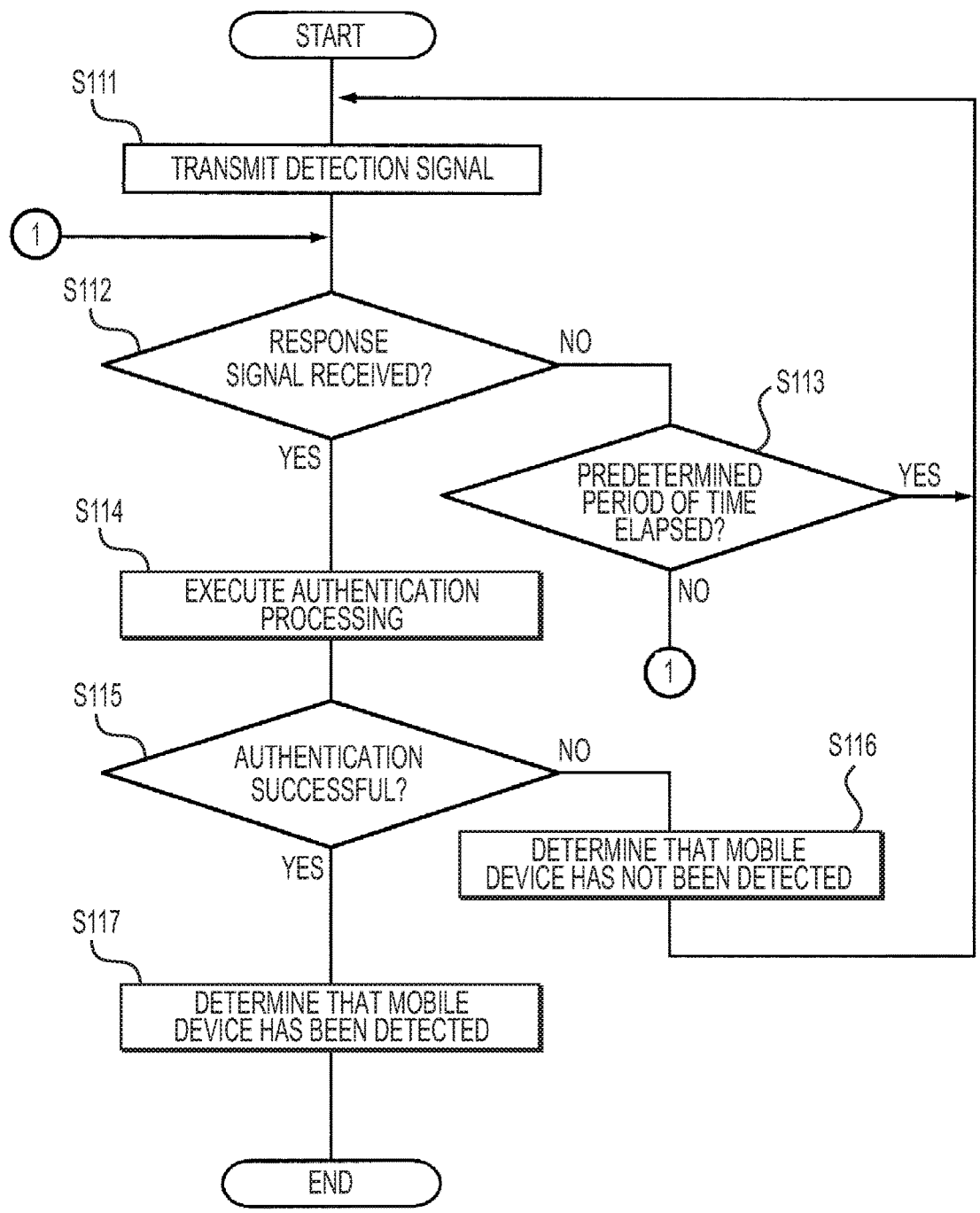
FIG. 5 is a flowchart illustrating the procedure of mobile device detection processing performed by the body ECU.

FIG. 5 is a flowchart illustrating the procedure of processing for detecting the mobile device 200, the processing being performed by the body ECU 110. The body ECU 110 executes the following processing when the doors of the vehicle 100 are locked. The control unit 111 of the body ECU 110 instructs the wireless communication device 120 via the communication unit 114 to transmit detection signals to the outside from the LF transmitting antennas 124a to 124e (step S111). After having transmitted the detection signals to the outside, the control unit 111 starts the built-in timer to measure the time that has elapsed from when the instruction was given to the wireless communication device 120.

Then, the control unit 111 of the body ECU 110 communicates with the wireless communication device 120 via the communication unit 114 to determine whether or not a response signal transmitted from the mobile device 200 has been received by the RF receiving unit 123 of the wireless communication device 120 (step S112).

If it is determined that a response signal has not been received from the mobile device 200 (No in step S112), the control unit 111 references the built-in timer and determines whether or not a predetermined time period has elapsed (step S113). If it is determined that the predetermined time period has elapsed without receiving a response signal (Yes in step S113), the control unit 111 returns to the processing in step S111. Furthermore, if the predetermined time period has not elapsed (No in step S113), the control unit 111 returns to the processing in step S112.

If it is determined that a response signal has been received from the mobile device 200 (Yes in step S112), the control unit 111 executes authentication processing based on the received response signal (step S114). Since a response signal transmitted from the mobile device 200 includes identification information for identifying the mobile device 200, the control unit 111 can execute the authentication processing by comparing the identification information included in the response signal with the identification information of the body ECU 110 stored in the storage unit 112.

Then, the control unit 111 determines whether or not authentication was successful in the authentication processing executed in step S114 (step S115). If it is determined that authentication was not successful (No in step S115), the control unit 111 determines that the mobile device 200 has not been detected (step S116), and returns to the processing in step S111.

On the other hand, if it is determined that authentication was successful (Yes in step S115), the control unit 111 determines that the mobile device 200 has been detected (step S117), and ends the procedure according to this flowchart. Note that if it is determined that the mobile device 200 has been detected, the control unit 111 can also specify the region in which the mobile devices 200 is present, based on the RSSI-related information included in the response signal received in step S112.

Figure 6:
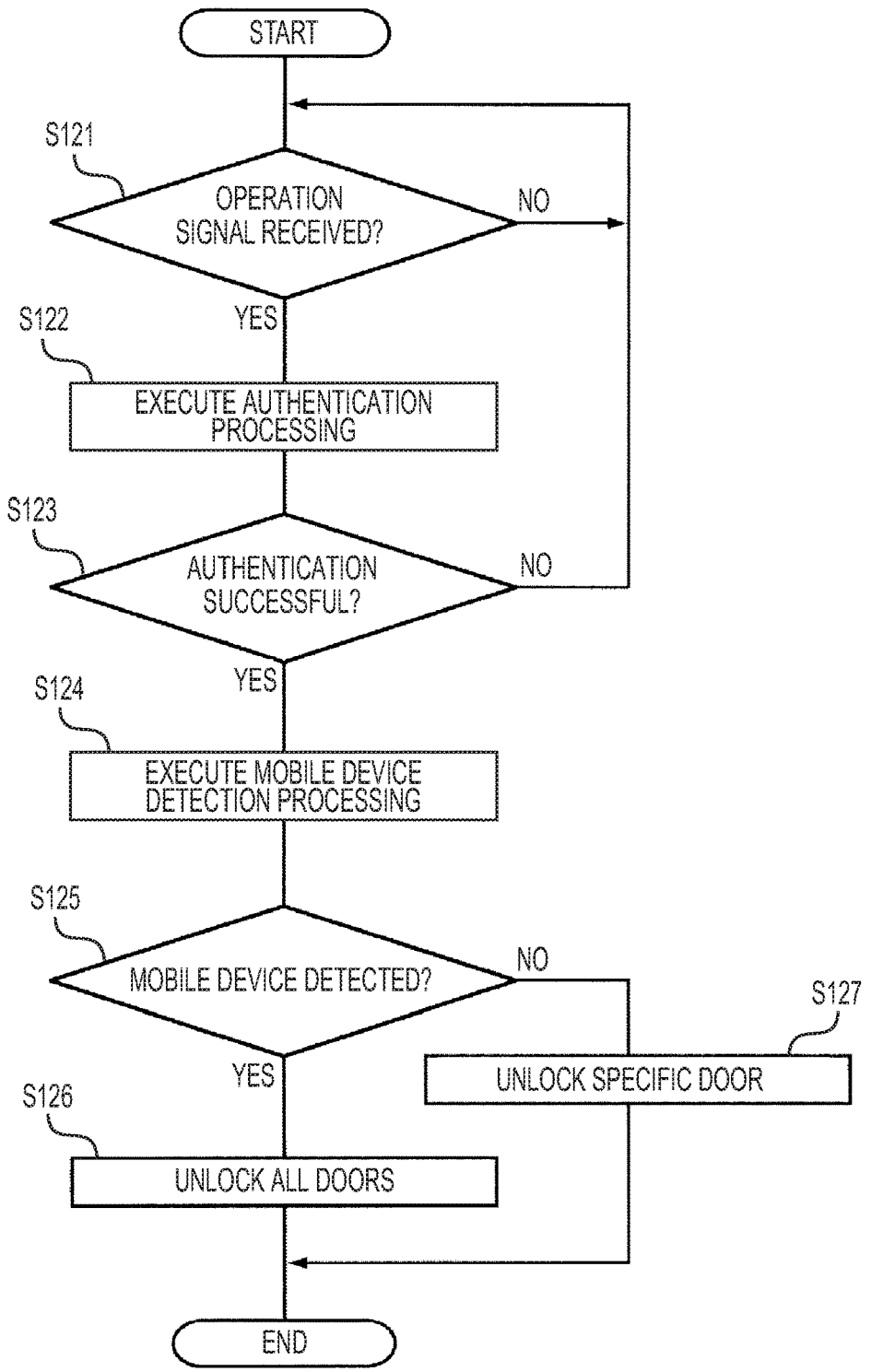
FIG. 6 is a flowchart illustrating the procedure of unlocking processing performed by the body ECU.

FIG. 6 is a flowchart illustrating the procedure of unlocking processing performed by the body ECU 110. The control unit 111 of the body ECU 110 communicates with the wireless communication device 120 via the communication unit 114 to determine whether or not an operation signal transmitted from the mobile device 200 has been received by the RF receiving unit 123 of the wireless communication device 120 (step S121). If it is determined that no operation signal has been received (No in step S121), the control unit 111 stands by until an operation signal is received.

If it is determined that an operation signal has been received (Yes in step S121), the control unit 111 executes authentication processing based on the received operation signal (step S122). Since the operation signal transmitted from the mobile device 200 includes identification information for identifying the mobile device 200, the control unit 111 can execute the authentication processing by comparing the identification information included in the operation signal with the identification information of the body ECU 110 stored in the storage unit 112.

Then, the control unit 111 determines whether or not authentication was successful in the authentication processing executed in step S122 (step S123). If it is determined that authentication was not successful (No in step S123), the procedure returns to step S121.

On the other hand, if it is determined that authentication was successful (Yes in step S123), the control unit 111 executes processing for detecting the mobile device 200 (step S124). The control unit 111 can execute the processing for detecting the mobile device 200 in accordance with the procedure shown by the flowchart in FIG. 5.

The control unit 111 determines whether or not the mobile device 200 has been detected in the processing for detecting the mobile device 200 (step S125). If it is determined that the mobile device 200 has been detected (Yes in step S125), that is, if it can be determined that the unlock button 203a of the mobile device 200 has been operated in the vicinity of the vehicle 100, the control unit 111 transmits a control signal for unlocking all of the doors of the vehicle 100 from the input/output unit 113 to the door lock mechanism 130, so as to unlock all of the doors (step S126). Note that, also when the user holding the mobile device 200 has operated the request switch provided on the door handle of the vehicle 100, the control unit 111 may transmit a control signal for unlocking all of the doors of the vehicle 100 from the input/output unit 113 to the door lock mechanism 130, so as to unlock all of the doors.

If it is determined that the mobile device 200 has not been detected (No in step S125), that is, if it can be determined that the unlock button 203a of the mobile device 200 has been operated at a position remote from the vehicle 100, the control unit 111 transmits a control signal for unlocking a specific door (the driver seat-side door, for example) of the vehicle 100 from the input/output unit 113 to the door lock mechanism 130, so as to unlock the specific door (step S127). Note that it is assumed that the information relating to a specific door to be unlocked in step S127 is stored in advance in the storage unit 112. The control unit 111 transmits a control signal for unlocking a specific door to the door lock mechanism, based on the information relating to the door to be unlocked stored in the storage unit 112.

Note that, with reference to the flowchart shown in FIG. 6, a configuration has been described in which an operation signal is received from the mobile device 200 and then processing for detecting the mobile device 200 is executed, but it is also possible to execute the processing for detecting the mobile device 200, and then determine whether or not an operation signal has been transmitted from the mobile device 200.

As described above, in Embodiment 1, if it can be determined that a user has operated the unlock button 203a of the mobile device 200 in the vicinity of the vehicle 100 in which the user can check the surroundings of the vehicle, all of the doors of the vehicle 100 are unlocked, and thus it is possible to ensure convenience. Furthermore, if it can be determined that a user has operated the unlock button 203a of the mobile device 200 at a position remote from the vehicle 100, a specific door (the driver seat-side door, for example) is unlocked, and thus it is possible to reduce the likelihood that a malicious person may enter the vehicle 100.

Embodiment 2

In Embodiment 2, a configuration will be described in which, if it can be determined that a user has operated the unlock button 203a of the mobile device 200 at a position remote from the vehicle 100, the control unit 111 of the body ECU 110 specifies the door to be unlocked.

Note that the configurations of the door locking system, the internal configurations of the body ECU 110, the wireless communication device 120, and the mobile device 200, and the like are the same as in Embodiment 1, and thus descriptions thereof are omitted.

Figure 7:
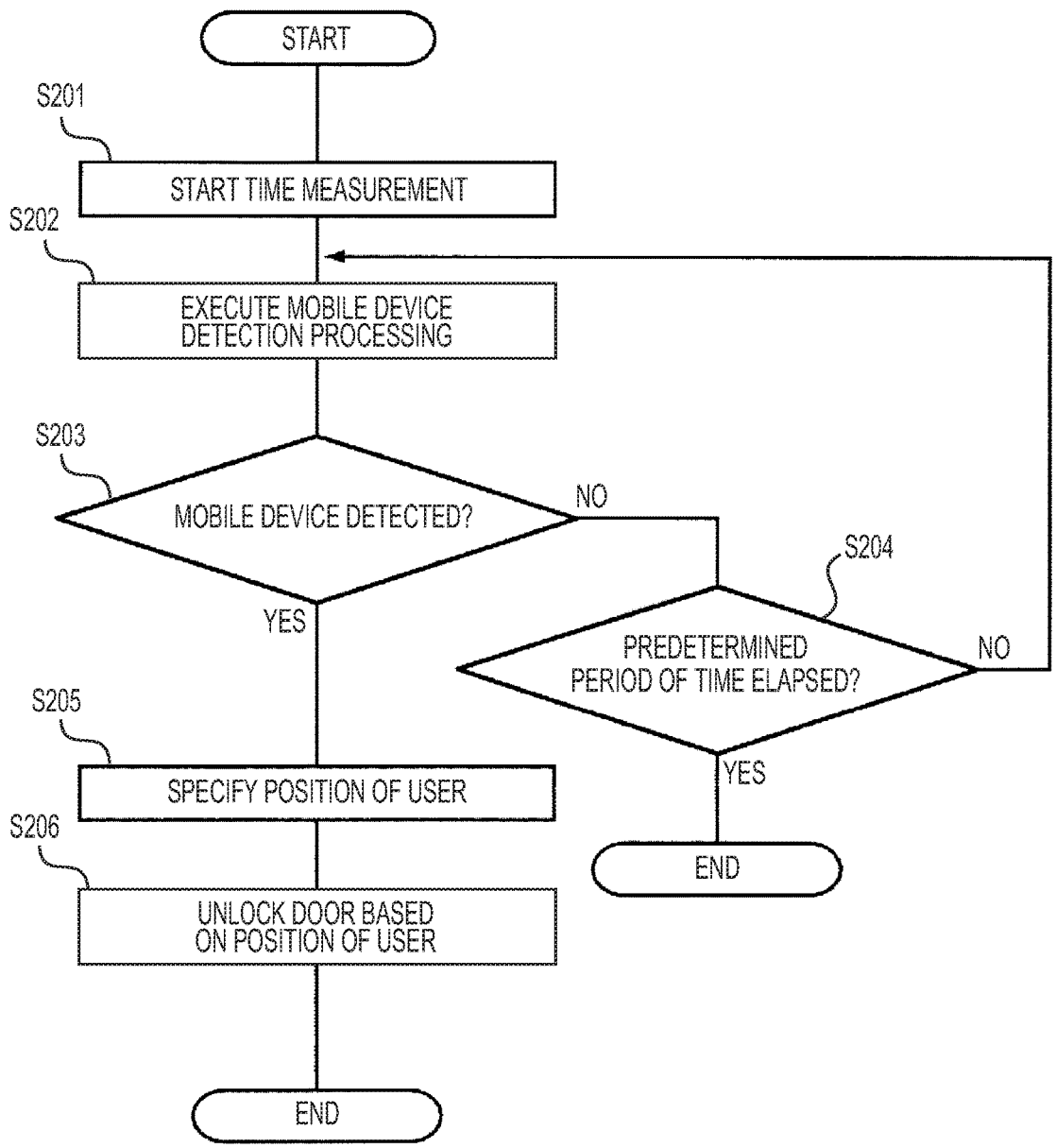
FIG. 7 is a flowchart illustrating the procedure of unlocking processing according to Embodiment 2.

FIG. 7 is a flowchart illustrating the procedure of unlocking processing according to Embodiment 2. If an operation signal has been received from the appropriate mobile device 200 and the mobile device 200 has not been detected, the control unit 111 of the body ECU 110 executes the following processing. Note that, if an operation signal has been received from the appropriate mobile device 200 and the mobile device 200 has been detected, the control unit 111 performs control such that all of the doors of the vehicle 100 are unlocked, as in Embodiment 1.

The control unit 111 starts measuring time using the built-in timer (step S201).

Then, the control unit 111 executes processing for detecting the mobile device 200 in accordance with the flowchart of FIG. 5 (step S202).

The control unit 111 determines whether or not the mobile device 200 has been detected by the detection processing (step S203). If the mobile device 200 has not been detected (No in step S203), the control unit 111 determines whether or not a set time period (one minute, for example) has elapsed from the start of the time measurement (step S204).

If the set time period has not elapsed (No in step S204), the control unit 111 returns to the processing in step S202. On the other hand, if it is determined that the set time period has elapsed without the mobile device 200 being detected (Yes in step S204), there is a possibility that the user has performed an erroneous operation on the mobile device 200, and thus the control unit 111 does not execute unlocking processing, and ends the procedure according to this flowchart.

If it is determined that the mobile device 200 has been detected within the set time period (Yes in step S203), it can be determined that the user who has operated the mobile device 200 at a position remote from the vehicle 100 has approached the vehicle 100, and thus the control unit 111 specifies the position of the user with respect to the vehicle 100 based on the detection result (step S205). In the processing for detecting the mobile device 200, a response signal received by the control unit 111 from the mobile device 200 includes RSSI-related information, and thus the control unit 111 can specify the position of the user holding the mobile device 200 based on the RSSI-related information.

The control unit 111 specifies the door to be unlocked based on the position of the user specified in step S205, and transmits a control signal for unlocking the determined door from the input/output unit 113 to the door lock mechanism 130, so as to unlock the determined door (step S206). For example, if the position of the user specified in step S205 is located within the communication range Ra of the LF transmitting antenna 124a, which is provided in the vicinity of the driver seat-side door, the control unit 111 decides to unlock the driver seat-side door. Furthermore, if the position of the user specified in step S205 is located within the communication range Rb of the LF transmitting antenna 124b, which is provided in the vicinity of the front passenger seat-side door, the control unit 111 decides to unlock the front passenger seat-side door. The same applies to cases where the specified user is located within the respective communication ranges Rc to Re of the LF transmitting antennas 124c to 124e, and the control unit 111 decides to unlock, in the respective cases, the right rear seat-side door (behind the driver seat), the left rear seat-side door (behind the front passenger seat), and the back door.

As described above, in Embodiment 2, only the door of the vehicle 100 that an authorized user is about to open can be unlocked, and thus, even if a suspicious individual is hiding in a blind spot from the user, the door in the vicinity of the suspicious individual can remain locked, making it possible to prevent the suspicious individual from entering the vehicle 100.

It is to be understood that the disclosed embodiments are exemplary in all respects and are not restrictive. The scope of the present disclosure is defined by the claims instead of the above-described meaning, and all meanings equivalent to the claims and all modifications within the scope are intended to be encompassed therein.

Although, for example, the present embodiments have described the door locking system that is applied to the vehicle 100 having five doors, the door locking system according to the present embodiment can of course be applied to a vehicle having two or more doors.

Furthermore, the mobile device 200 is not necessarily a communication device dedicated to transmitting a control signal for controlling locking of the vehicle doors, and a configuration is also possible in which a terminal device such as a smartphone held by a user is provided with the function of the mobile device 200 according to the present embodiment.

The invention claimed is:
1. A vehicle door unlocking system comprising:
a mobile device that is provided with an interface for accepting an operation to unlock a plurality of doors provided on a vehicle, and is configured to transmit an operation signal when the interface has accepted the operation; and
an on-board controller configured to perform, upon receiving the operation signal from the mobile device, control to unlock the plurality of doors based on the received operation signal,
wherein the on-board controller includes:
a detector configured to detect the mobile device, and the on-board controller is configured to unlock only a specific door of the plurality of doors provided on the vehicle, upon receiving the operation signal from the mobile device without the mobile device being detected by the detector.

2. The vehicle door unlocking system according to claim 1,
wherein the on-board controller is configured to unlock all of the doors of the vehicle, if the mobile device is detected by the detector and the operation signal is received from the mobile device.

3. The vehicle door unlocking system according to claim 1,
wherein the vehicle includes:
a detection signal transmitter configured to transmit a detection signal for detecting the mobile device; and
a response signal receiver configured to receive a response signal in response to the detection signal transmitted by the detection signal transmitter,
the mobile device includes:
a detection signal receiver configured to receive the detection signal transmitted from the detection signal transmitter; and
a response signal transmitter configured to transmit the response signal in response to the detection signal received by the detection signal receiver, and
the detector is configured to detect the mobile device based on the response signal received by the response signal receiver.

4. The vehicle door unlocking system according to claim 3,
wherein the detection signal that is transmitted by the detection signal transmitter is a signal in an LF (Low Frequency) band, and
the response signal that is transmitted by the response signal transmitter is a signal in an RF (Radio Frequency) band.

5. The vehicle door unlocking system according to claim 1,
wherein the specific door is a door on a driver seat side.

6. The vehicle door unlocking system according to claim 3,
wherein the mobile device includes a controller that is configured to:
measure a signal strength of a detection signal received by the detection signal receiver, and
add information relating to the signal strength measured by the measurement unit to a response signal to be transmitted from the response signal transmitter, and
the on-board controller is configured to:
determine, if an operation signal has been received from the mobile device without the mobile device being detected by the detector, whether or not a response signal has been received from the mobile device within a set time period; and
specify, if it is determined that a response signal has been received from the mobile device within the set time period, a door to be unlocked based on the information relating to a signal strength that is included in the received response signal.

7. An on-board controller that is capable of communicating with a mobile device configured to transmit an operation signal upon accepting an operation to unlock a plurality of doors provided on a vehicle, the on-board controller performing, upon receiving the operation signal from the mobile device, control to unlock the plurality of doors based on the received operation signal,
wherein the on-board controller comprises:
a detector configured to detect the mobile device, and
the on-board controller is configured to unlock only a specific door of the plurality of doors of the vehicle, upon receiving an operation signal from the mobile device without the mobile device being detected by the detector.

* * * * *